July 25, 1944.　　　　G. S. BAYS　　　　2,354,299
VISCOSIMETER
Filed June 11, 1941　　3 Sheets-Sheet 1
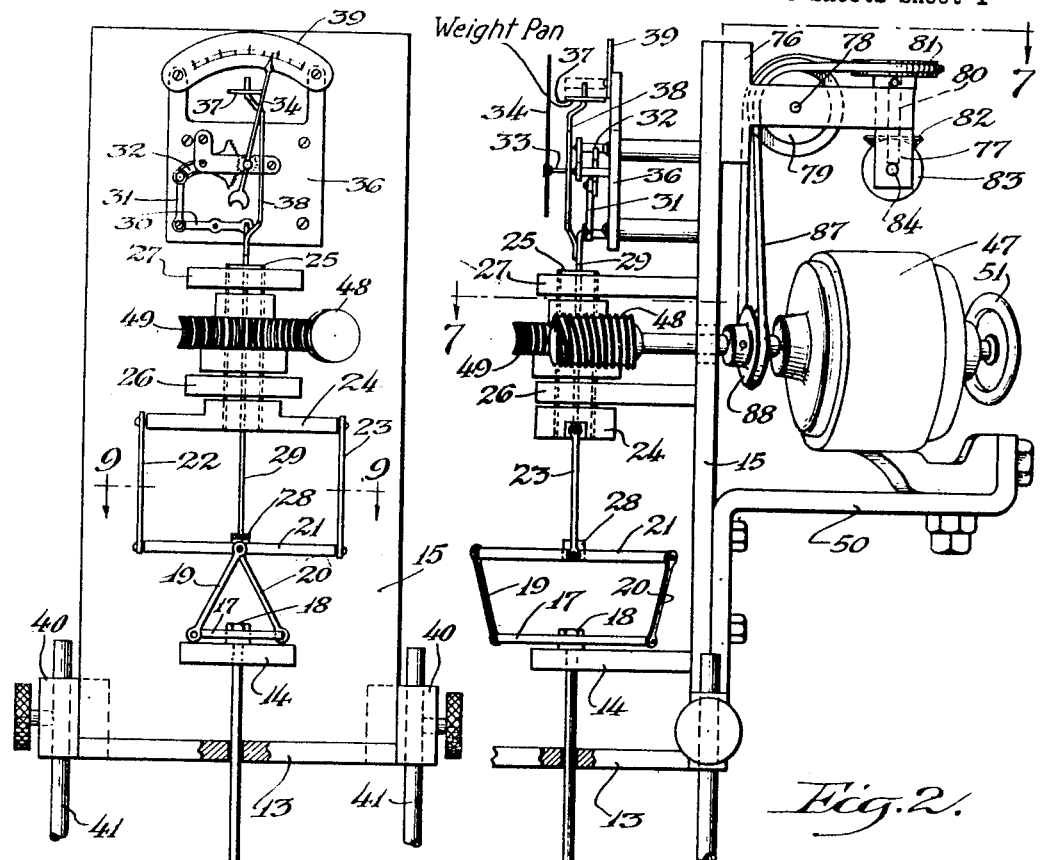
Fig. 1.
Fig. 2.
Fig. 3.
Inventor:
George S. Bays
By Everett A. Johnson
Attorney
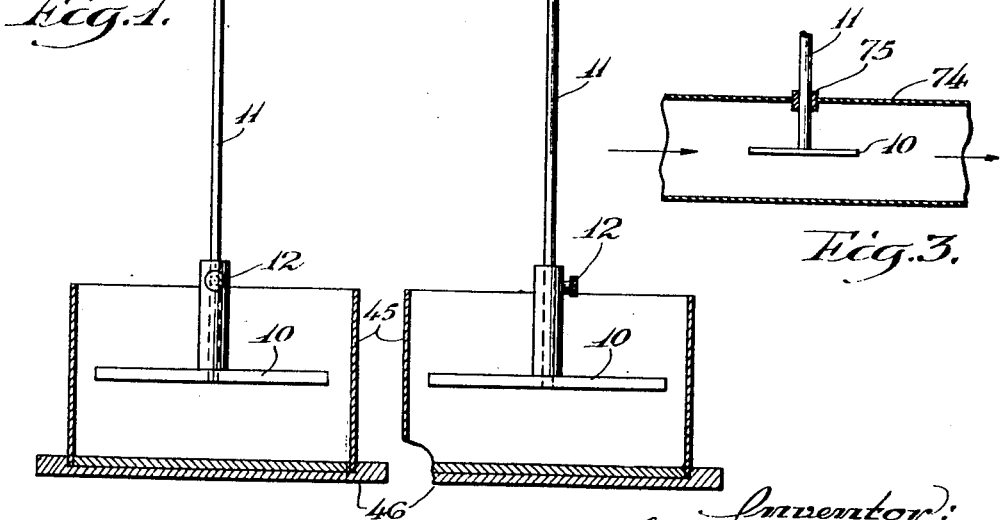

July 25, 1944. G. S. BAYS 2,354,299
VISCOSIMETER
Filed June 11, 1941 3 Sheets-Sheet 2

Inventor:
George S. Bays
By Everett A. Johnson
Attorney

July 25, 1944.   G. S. BAYS   2,354,299
VISCOSIMETER
Filed June 11, 1941   3 Sheets-Sheet 3
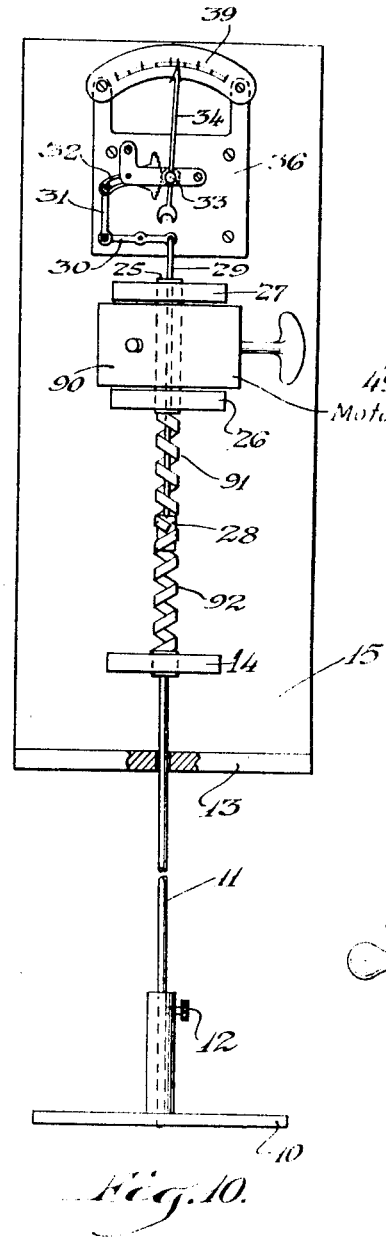
Fig. 10.
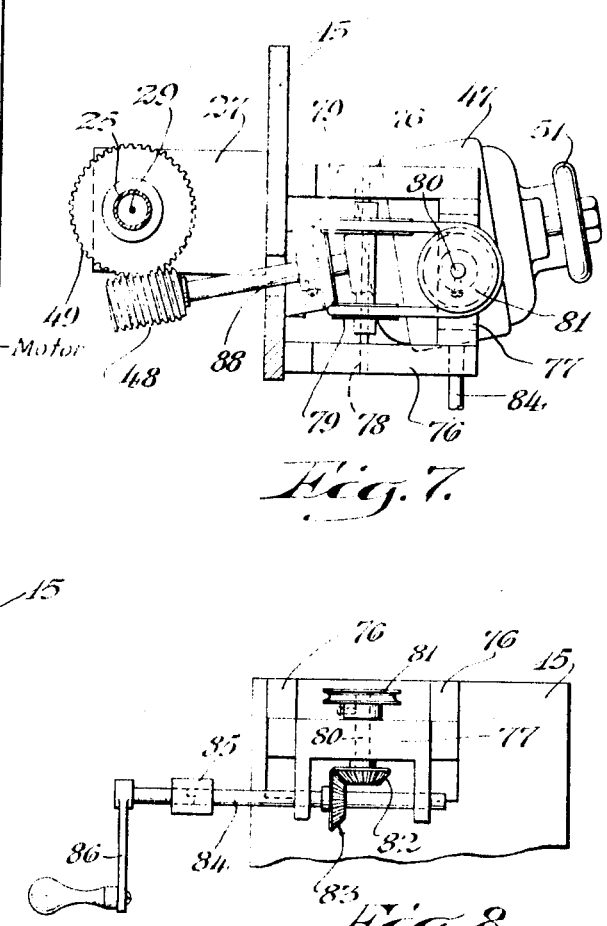
Fig. 7.
Fig. 8.
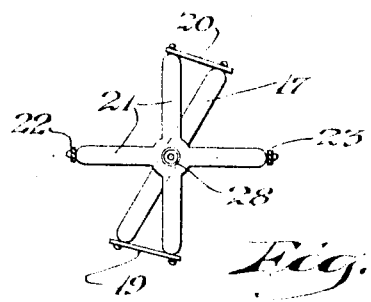
Fig. 9.
Inventor
George S. Bays
By Everett A. Johnson
Attorney.

Patented July 25, 1944

2,354,299

UNITED STATES PATENT OFFICE 2,354,299

VISCOSIMETER

George S. Bays, Tulsa, Okla., assignor to Stanolind Oil and Gas Company, Tulsa, Okla., a corporation of Delaware Application June 11, 1941, Serial No. 397,595

7 Claims. (Cl. 265—11)

This invention relates to a method and apparatus for determining the viscosity of fluids such as oil, mud, cement slurries and the like.

My invention represents a great improvement over the methods and apparatus heretofore used to determine and record viscosity of fluids. Various methods and apparatus which have been used measure the resistance to the flow of viscous materials through tubes, the time taken for a measured volume of such materials to flow through an orifice, or the work or energy necessary to rotate agitators in a body of fluid. Capillary viscosimeters and devices involving the time of fall of a body through a viscous fluid likewise have been employed. None of these has been entirely satisfactory. One difficulty is that seldom is the measurement solely of the viscosity; inherently in such prior art measurements the specific gravity or other property of the fluid is measured along with the viscosity, and varying viscosity readings are obtained even though the fluids were of the same viscosity, depending upon varying specific gravities.

An essential feature of rotary drilling is the use of drilling mud. The functions of the drilling mud are to carry the cuttings up to the surface, to lubricate the drill bit, to keep down the formation pressures and to build a mud wall or sheath on the surface of the bore hole. The viscosity of the drilling mud greatly influences the efficiency with which these functions are performed. The drill fluid must be sufficiently viscous to carry the well cuttings to the surface. Likewise the drill mud should be viscous if it is to have good wall or sheath-building qualities. However, the drill mud must be sufficiently non-viscous so that separation of the well cuttings can be effected and so that the drill fluid can be handled with reasonable equipment.

Drilling muds which have these desired properties ordinarily consist of a vehicle such as fresh water, with materials of relatively high specific gravity such as finely divided iron oxide, barium sulfate, non-colloidal clays, and the like to give the desired hydrostatic head to the drilling fluid; and finely divided colloidal clays such as bentonite to suspend the weighting material and give the desired suspending ability and wall-building characteristics to the drill mud. Although the drill mud has the desired viscosity when drilling begins, it does not ordinarily retain its desired characteristics. For example, if salt water enters the fluid a sharp increase in viscosity results which makes the mud too thick to pump, the wall-building properties are destroyed, and separation of the cuttings is made difficult. Also, an undesirable increase in viscosity results when finely ground drill cuttings which are soluble in water and alkaline mix with the drill fluid. Similarly, large quantities of fresh water encountered in drilling can so reduce the viscosity by dilution that the drill cuttings are not carried to the surface.

The viscosity can be controlled by suitable chemical treatment of the drill fluid when there is an increase in viscosity and by the addition of greater quantities of the finely divided solids when there has been a dilution. In either case it is necessary to measure the viscosity of the drill fluid to maintain and control the optimum viscosity.

Viscosity is a term which in thixotropic fluids, such as drilling muds, has no absolute meaning. A thixotropic fluid is one in which the viscosity depends upon the shearing stress applied to the mud particles. Subject to no shear, a drilling mud tends to "set up" and form a gel. When it is agitated, the viscosity reduces as the agitation or rate of shear increases. Hence, viscosity of a drilling fluid should be based on a standard rate of shear.

The methods and apparatus heretofore available are not satisfactory for various reasons. The most common method for estimating the viscosity of drill mud is to remove a sample and note the time interval necessary for the drill mud to flow from a standard vessel, such as a Marsh funnel, having a standard orifice. This means is not reliable because the apparent viscosity is influenced by the highly varying rate of shear as well as the density of the mud. The most satisfactory prior art method of determining mud viscosity involved the use of the Stormer Viscosimeter in which a metal cup suspended in the mud was rotated by a falling weight, and the amount of weight necessary to make the weight fall a certain distance in a certain time determined the reading. This device is not direct reading. The method is essentially a "batch process" measurement rather than a continuous determination of the viscosity. The design is not one that inherently provides for constant speed of agitation which is a definite requisite for such measurements, as described above. Finally, the instrument is a laboratory instrument and has been found too difficult to keep in proper condition when used in routine field operations. By my invention I provide a novel means for measuring the true viscosity as the drilling proceeds so that appropriate steps can be taken to maintain the viscosity within the optimum range.

In one embodiment of my invention the apparatus is a spring-driven pocket-size instrument adapted for spot or field testing. For instance, the viscosity measurement can be made on the mud in the usual ditch beyond the point where mud from the well is discharged and the cuttings are separated. This can be done by the mud engineers in minimum time and with minimum effort without removing a sample. In addition to being a convenient test, all measurements are made under uniform conditions of shear and the observed reading which is immediately obtained is an accurate and reproducible measurement of the viscosity.

My invention is particularly useful in the mud logging of wells being drilled by the rotary method employing a continuous stream of drilling fluid. In the various methods and apparatus for analyzing the nature and extent of formations being penetrated by the drill bit advantage is taken of the fact, which has long been well known, that in a rotary drilling operation the formation penetrated by the drill bit is drilled up and carried by the circulating drilling mud to the top of the well. There are a number of different tests which can be applied to drilling mud returns and preferably a number of them are used simultaneously so that the most complete picture of the nature of the formation being penetrated is obtained. Among these tests are analyses for crude oil, hydrocarbon gas and electrical conductivity. By another embodiment of my invention I provide a method and means for measuring and recording the viscosity of the drilling mud. It is advantageous that all of these tests be carried out continuously and the results automatically recorded in juxtaposition on a chart, so that all of the information will be readily available and in convenient form for correlation.

One of the principal objects of my invention is to provide an apparatus and method for measuring the viscosity of fluids, particularly thixotropic fluids, independent of specific gravity or other physical properties of such fluid.

Another object of my invention is to provide an apparatus and method for indicating the change in viscosity of a fluid.

A still further object of my invention is to provide an apparatus and method for continuously measuring and recording the viscosity of a flowing fluid.

A more specific object of my invention is to provide a simple and efficient method and apparatus for continuously determining the viscosity of drilling mud. Another object is to provide a novel test to be carried out continuously as part of a mud-logging operation.

In accordance with my invention I attain these and other objects by providing a method and apparatus the operation of which is based on the restraining force offered to a disc rotating at substantially constant speed, by a fluid in which the disc is submerged. This restraining force is evidenced by a torque set up in the driving shaft. This torque in turn is measured by the displacement of a flexible coupling or linkage introduced between the driving shaft and the driving means, either a spring-wound or electric motor. This displacement which is a function of the viscosity of the fluid under test, is in turn transmitted mechanically or electrically to indicating, recording or regulating means.

My invention will be understood from the following description when considered in connection with the accompanying drawings forming a part thereof, and in which:

Figure 1 is a vertical elevation of one embodiment of apparatus constructed in accordance with my invention;

Figure 2 is a side view of the apparatus shown in Figure 1;

Figure 3 illustrates the use of my invention in connection with a continuously flowing fluid;

Figures 7 and 8 are detailed views which when taken with Figure 2 show the driving means; Figure 7 is a view partly in section taken along the line 7—7 of Figure 2;

Figure 9 is a section along the line 9—9 of Figure 1 showing the arrangement of the displaceable coupling means;

Figure 10 is a vertical elevation of a portable viscosity measuring apparatus showing another embodiment of displaceable coupling means.

Figures 4, 5:
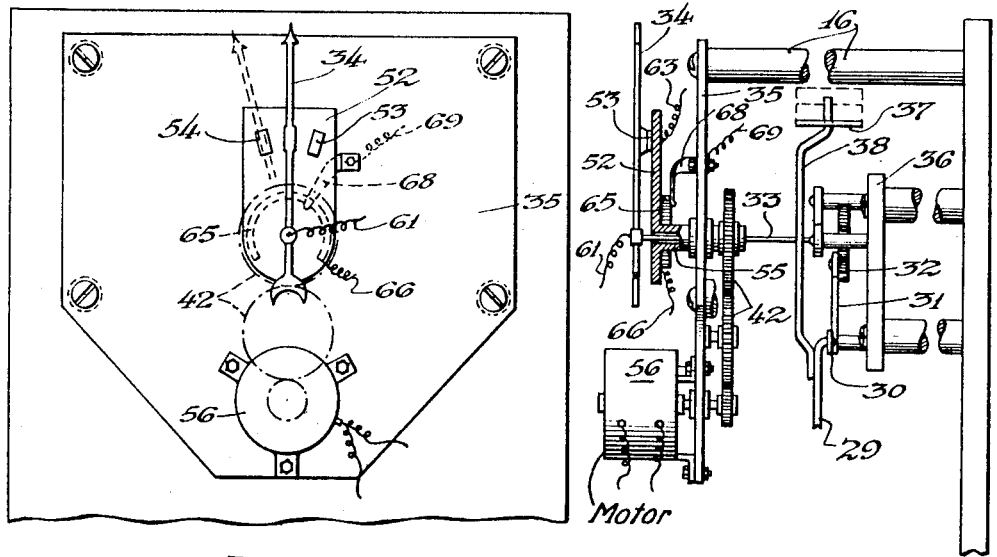
Figure 4 is a side view partially in section of a recorder actuating mechanism.
Figure 5 is a front view of the recorder actuating mechanism.

In Figures 1 and 2 one embodiment of my viscosimeter is shown. A disc 10 is attached to a stirrer shaft 11, for example by thumb screw 12. The shaft is journaled in bearings in supports 13 and 14 which are attached firmly to back plate 15.

The shaft 11 is rotated at a relatively constant speed through a special coupling mechanism. This is composed of a two-armed lower spider 17, held to shaft 11 by means of a nut 18, two tie members 19 and 20, cruciform middle spider 21, two more tie members 22 and 23, and a two-armed upper spider 24. Each tie is pivoted at the ends to an arm of the middle spider 21 and to an arm of the lower spider 17 or to the upper spider 24. The arms of all spiders are preferably of substantially equal length. The upper spider is preferably integral with a driven hollow shaft 25 which is rotatably supported in bearings in two supports 26 and 27 attached to the back plate 15.

An electric motor 47, which can be of either direct or alternating current type, drives the hollow shaft 25 through worm 48 and meshing gear 49, which is pinned to the shaft 25. Motor 47 is supported by a bracket 50 which in turn is bolted to back plate 15.

The restraining force offered to disc 10 when it is immersed in a fluid is measured by means of an indicating mechanism coupled to the linkage mechanism described. In the center of middle spider 21 is mounted a bearing cup 28. A pin 29 which preferably is conically pointed rests in the depression in bearing cup 28, passes up through the hollow shaft 25 and pivotably attaches to a lever 30. The opposite end of this lever is connected through link 31 to a quadrant gear 32. The teeth of this gear mesh with those of a pinion attached to the shaft 33 of the indicator 34, said shaft being journaled in bearings in plate 36.

To the back plate 15 are attached two clamps 40 each fitted with an appropriate thumb screw. Through these clamps protrude the rods 41 of a supporting stand, by means of which disc 10 can be positioned a given distance above the surface on which the stand is placed. The disc 10 can thus be adjusted with respect to the level of a sample of fluid, such as drilling mud, in a cup 45 with base 46 placed in front of the stand.

As may be seen by reference to Figures 1 and 2, rotation of the upper spider 24 in a clockwise direction as viewed from above will not change appreciably the relative positions of the three spiders as long as there is no resistive force applied to the disc 10. However, when the disc 10 is immersed in the material under test, additional torque must be supplied to maintain constant speed, and each of the two lower spiders will tend to move to a position counterclockwise with respect to the spider immediately above. Such relative motion raises the middle spider 21 with respect to the other two spiders, thus raising pin 29, which in turn through the link 31 and quadrant gear 32 rotates the indicator 34. The greater the restraining force due to higher mud viscosity, the greater will be the angle through which the indicator 34 is turned. If desired a spring or other means (not shown) can be provided to resist the displacement of pin 29.

Since the effect of the fluid viscosity on the instrument is to raise pin 29, a calibration device can be incorporated in the instrument. A small weight pan 37 can be mounted on an extension 38 of the pin 29. Small perforated weights can be placed on the weight pan 37 during a viscosity test. These weights have been previously checked on a master viscosimeter of this type and are marked in viscosity units. If a reading of 20 centipoises is obtained for a particular mud, weights marked equivalent to 20 centipoises placed on the pan 37 should reduce the reading to zero. If this is not the case, the speed should be checked, the disc cleaned, etc.

In the embodiment shown in Figures 2, 7 and 8 an auxiliary driving means is provided. A pair of pulley brackets 76 are attached to back plate 15 and rearwardly support a gear bearing block 77 and an idler shaft 78. Two idler pulleys 79 are mounted on idler shaft 78. The gear bearing block 77 supports a pulley shaft 80 having driving pulley 81 on one end and a driven gear 82 fixed to the other. Driven gear 82 meshes with driving gear 83. The driving gear 83 is secured to clutch rod 84 which is rotatably mounted in gear bearing block 77. A suitable clutch 85 can be provided between the gear 83 and crank 86. A belt 87 passes over driving pulley 81, idler pulleys 79 and pulley 88 on the drive shaft of motor 47. Although a clutch mechanism has been provided it is contemplated that the same result can be obtained by removing the belt 87 when the motor 47 is driving the worm 48.

In operating this device, disc 10 is immersed in the fluid and rotated by motor 47. After the disc is rotating at constant speed, the position of indicator 34 relative to scale 39 is noted. This scale can be calibrated directly in centipoises or any other convenient units.

I have found that by this apparatus very satisfactory readings of the viscosity of fluids can be immediately obtained and repeated. This is true in the case of thixotropic fluids as well as in the case of fluids having a viscosity independent of shearing rate. Changes in viscosity can be determined as they occur. Other properties of the fluid not directly connected with the viscosity do not affect the results. The meter can be read in quiescent fluids or in flowing streams. The range of the readings can be rapidly changed by releasing thumb screw 12, removing disc 10 and replacing it with another disc of different dimensions. The whole instrument is simple and rugged—qualities of definite importance in a field instrument.

Measurements of the so-called "gel strength" can also be obtained from this instrument. Drilling fluids have a tendency to form gels when allowed to remain quiescent. This is desirable as opposing the tendency of the cuttings and weighting materials in the fluid to settle out when circulation ceases. Measurement of this quantity is accomplished by placing a cylindrical member in the sample of fluid to be tested, leaving it there for a sufficient time so that the gel forms (normally a standard time of ten minutes is used), then applying increased torque to the cylinder until the shearing force on the outer surface is sufficient to break the cylinder loose from the gel. The maximum torque exerted on the cylinder is taken as the measure of the gel strength of the sample.

It will be noted by reference to Figures 2 and 7 that the electric motor 47 is fitted with a hand wheel 51 which is attached to the end of the motor shaft. After the cup 45 has been filled with a sample of, say drilling fluid, and the disc 10 immersed in this fluid, the sample is allowed to stand for the usual standard time without agitation. The operator then gradually turns the hand wheel 51 which through the linkage mechanism applies an increasing torque to disc 10. As long as this is constant, middle spider 21 will continue to rise and indicator 34 will correspondingly rotate. The maximum reading is obtained just prior to the shearing of the mud at the periphery of the disc and hence is a measure of the gel strength of the sample.

Figure 6:
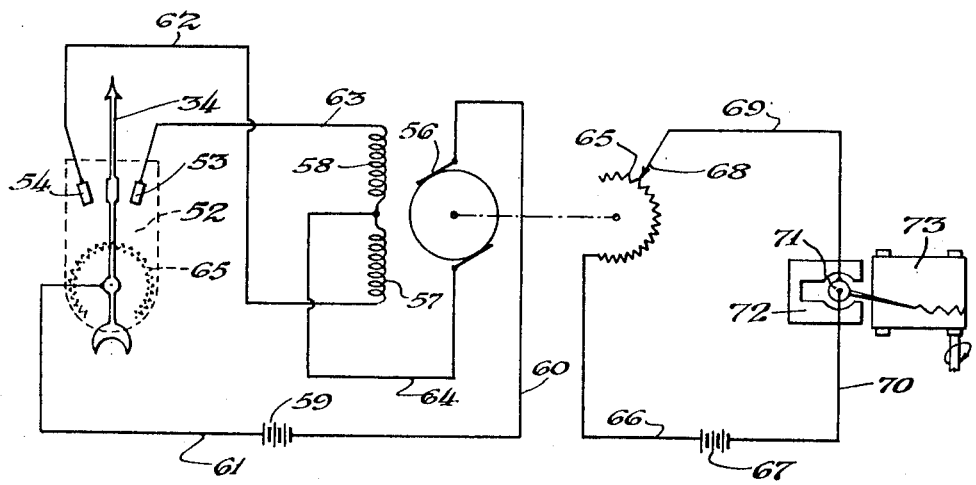
Figure 6 is a diagrammatic representation of one form of electrical circuit utilized with my viscosimeter to record continuously the viscosity of the fluid under test.
Figure 11:
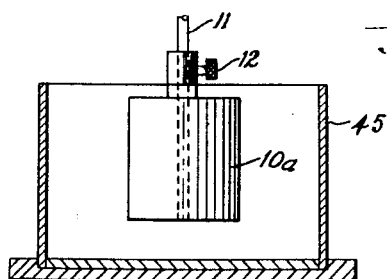
Figure 11 illustrates one embodiment of my invention wherein the immersible member is a cylinder.

This instrument is easily adapted to automatic continuously recording operation. One such adaptation is shown partially in diagram by Figures 4, 5 and 6. A plate 35 supported by spacers 16 supports the recorder actuating means. Immediately back of the indicator is mounted a small insulated contact block 52 carrying two electric contacts 53 and 54. This block is mounted on or integral with a hollow shaft 55 which is coaxial with shaft 33 and is geared by train 42 to a small reversing motor 56, for example of $1/32$ horsepower, mounted on plate 35. This motor has double field windings 57 and 58, and can be operated either by alternating or direct current. In Figure 6 motor 56 is energized by battery 59 through leads 60, 61, 62, 63 and 64. The motor is used to drive the contact block 52 to such a position that contacts 53 and 54 are not contacting indicator 34. If one of these circuits closes, current flows through one field coil and the armature, rotating block 52 into alignment with the indicator 34. When this alignment is such that the contact opens, the block 52 occupies the same relative angular position as does indicator 34. Leads 62 and 63 are flexible, so that no distorting torque can be introduced by their use.

Mounted on the back of contact block 52 is a rheostat 65, one end of which is connected through a flexible lead 66 to a battery 67 mounted on the instrument and shown in the diagram comprising Figure 6. The slider 68 is supported by plate 35 and bears lightly against the rheostat 65. Lead 69 from slider 68 and lead 70 from battery 67 form a double, insulated conductor which may be of any reasonable length, and which is connected to the coil 71 of recording milliammeter 72 having a moving chart 73 on which the viscosity of the fluid is constantly recorded. Since motor 56 keeps contact block 52 always aligned with the indicator 34, the angular position of the rheostat 65 mounted on block 52 will occupy a given position relative to slider 68 for any given viscosity. The resistance in the recording circuit thus varies directly with the fluid viscosity, which in turn varies the current recorded in the desired manner.

It is not claimed that the telemetering circuit described is particularly unique. Many other circuits known in the prior telemetering art could be successfully employed for this purpose.

Preferably when using this recording viscosimeter, suitable provision is made for exposing disc 10 to a supply of fluid that is constantly being renewed. Thus, an arrangement such as shown in Figure 3 can conveniently be used. Here the fluid undergoing test flows through a pipe or trough 74. Disc 10 is immersed in the fluid. Shaft 11 passes out through a low-friction stuffing box 75 or the like. Since the resultant torque on disc 10 due to fluid flow is for all practical purposes negligible, the viscosimeter will correctly measure the fluid viscosity in the stream. Gel strength measurements are of course impossible as long as the fluid is in movement.

In Figure 10 a simple portable viscosimeter is shown. Disc 10 is attached to a stirrer shaft 11, for example by thumb screw 12. The shaft is journaled in a bearing in support 13 which is attached firmly to back plate 15.

The shaft is rotated by a spring-driven motor 90 at a relatively constant speed through a displaceable spring-coupling mechanism. This is composed of upper and lower opposed helical springs 91 and 92, the lower end of the lowermost spring 92 being fixed to shaft 11. The upper end of spring 92 and the lower end of spring 91 are joined by bearing cup 28. The springs are so arranged that the one will extend while the other retracts when torque is applied to one end of the coupling means. The upper end of the coupling means is preferably fixed to a hollow shaft 25 which is rotatably supported in bearings in supports 26 and 27 attached to the back plate 15 on opposite sides of the spring motor 90. Shaft 25 is driven by spring motor 90 in a conventional manner. By the apparatus thus described disc 10 is rotated at the desired speed. A restraining force offered to disc 10 when it is immersed in a fluid is measured by means of an indicating mechanism similar to that described in connection with Figures 1 and 2. A pin 29 which preferably is conical pointed rests in a description bearing cup 28 carried by spring-linkage means and passes up through the hollow shaft 25 pivotally attaching to a lever 30. The opposite end of this lever is connected through link 31 to a quadrant gear 32. The teeth of this gear 32 are meshed with those of a pinion attached to shaft 33 of the indicator 34, said shaft being journaled in bearings in front plate 36. A suitable scale 39 can be provided as shown.

It may be seen by reference to Figure 10 that rotation of the springs 91 and 92 will not change appreciably the relative position of the bearing cup 28 when there is no resistive force applied to the disc 10. However, when the disc 10 is immersed in the material under test, additional torque must be applied to maintain constant speed and the upper spring 91 will tend to shorten and the lower spring 92 will be extended. Such relative motion raises the bearing cup 28 thus raising pin 29, which in turn through link 31 and quadrant gear 32 rotates the indicator 34. The greater the restraining force due to higher mud viscosity, the greater will be the vertical displacement of the bearing cup 28.

From the above it will be apparent that I have described in broad aspects novel and efficient apparatus for determining the viscosity of fluids, which can be applied simultaneously with other test methods used in mud logging of a well being drilled. A pocket-size, spring-wound portable instrument operating in accordance with my invention has been shown and its operation described. Other embodiments adapted for use in a laboratory or mud-logging unit and in connection with flowing fluid have also been illustrated.

Obviously, many modifications can be made within the spirit of my invention and I do not intend to be limited to the specific embodiments described herein but only by the scope of the appended claims.

I claim:

1. An apparatus for measuring the flow properties of fluids, said apparatus including a rotatable member having surfaces generated by revolving a rectangle about the axis of rotation and being adapted to be driven in contact with the fluid under test with substantially no agitation, a drive shaft attached to said member, a driving means for said shaft, a longitudinally displaceable coupling means disposed between one end of said shaft and said driving means, the upper and lower extremities of the coupling means being fixed against longitudinal movement and an intermediate portion of said coupling means being longitudinally displaceable in proportion to the resisting torque produced by the drag on the rotatable member by the viscosity of the fluid, and means actuated by the said intermediate portion to indicate the extent of displacement.

2. The apparatus of claim 1 wherein the displaceable coupling means comprises a linkage of a plurality of hinged rigid members and a cruciform spider.

3. The apparatus of claim 1 wherein the displaceable coupling means comprises coil spring means.

4. The apparatus of claim 1 wherein the rotatable member comprises a circular member.

5. An apparatus for indicating characteristics of thixotropic fluids, said apparatus including a drive shaft, a disc fixed to one end of said shaft in a plane perpendicular to the axis of rotation of the shaft, one end of a displaceable coupling being fixed to said shaft, means fixed to the other end of said coupling for driving said disc through said coupling and said shaft, an intermediate portion of said coupling being adapted to be longitudinally displaced independently of the longitudinally fixed ends of said coupling, and means carried by said intermediate portion for indicating the extent of displacement.

6. An apparatus for indicating the viscosity of fluids substantially independently of fluid density, said apparatus comprising a disc adapted to be driven in contact with the fluid under test, a driven shaft fixed to said disc, a driving means in fixed spaced relation thereto, a link extending between said shaft and said driving means, said link comprising an upper pair of oppositely extending arms fixed to said driving means, a lower pair of oppositely extending arms fixed to said driven shaft, a cruciform middle spider, a pair of upwardly extending rigid tie means hinged to the ends of opposite legs of said spider and said upper pair of arms, a pair of downwardly extending rigid tie means hinged to the ends of opposite legs of said spider and said lower pair of arms, whereby the cruciform spider is rendered longitudinally displaceable, the extent of longitudinal displacement of said spider being substantially independent of the density of the fluid under test.

7. The method of measuring the resistance of thixotropic fluids to viscous flow which comprises continuously maintaining viscous flow of said fluids, applying a non-destructive rotational shear force to a substantial plane sub-area of the continuously renewed thixotropic fluid in a plane substantially parallel to the direction of flow of the fluid, and determining the magnitude of the torque resulting from the resistance of the thixotropic fluid to shear as an indication of the viscosity of the said fluid, whereby a measure of the resistance to flow is obtained without appreciable destruction in the micellar zones of a body of the thixotropic fluid.

GEORGE S. BAYS.